United States Patent
Zhou

(10) Patent No.: US 11,437,846 B2
(45) Date of Patent: Sep. 6, 2022

(54) RELIABLE RESILIENT ROUTER FOR WIDE-AREA PHASOR MEASUREMENT SYSTEM OF POWER GRID

(71) Applicant: ZHEJIANG LAB, Hangzhou (CN)

(72) Inventor: Boyang Zhou, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 17/566,741

(22) Filed: Dec. 31, 2021

(65) Prior Publication Data
US 2022/0255346 A1 Aug. 11, 2022

Related U.S. Application Data

(63) Continuation of application No. PCT/CN2021/075891, filed on Feb. 7, 2021.

(51) Int. Cl.
*H04L 67/12* (2022.01)
*H04L 41/069* (2022.01)
*H02J 13/00* (2006.01)

(52) U.S. Cl.
CPC .. *H02J 13/00001* (2020.01); *H02J 13/00016* (2020.01); *H04L 41/069* (2013.01); *H04L 67/12* (2013.01)

(58) Field of Classification Search
CPC .......... H02J 13/00001; H02J 13/00016; H04L 41/069; H04L 67/12
See application file for complete search history.

(56) References Cited

U.S. PATENT DOCUMENTS 8,780,706 B1    7/2014  Donner et al.
2004/0229612 A1  11/2004  Narayanan et al.

FOREIGN PATENT DOCUMENTS

| CN | 1685675 A | 10/2005 |
| CN | 101615990 A | 12/2009 |
| CN | 103973482 A | 8/2014 |
| CN | 106487673 A | 3/2017 |

(Continued)

OTHER PUBLICATIONS

International Search Report (PCT/CN2021/075891); datd Oct. 26, 2021.

(Continued)

*Primary Examiner* — Rexford N Barnie
*Assistant Examiner* — Thai H Tran
(74) *Attorney, Agent, or Firm* — W&G Law Group

(57) ABSTRACT

Disclosed is a reliable resilient router for a wide-area phasor measurement system of a power grid. The reliable resilient router includes a Data-type data packet processing module, a RetransReq data packet processing module, a RetransReport data packet processing module, a basic data packet processing module, a multi-path forwarding state table module, a content storage queue module and a physical port. The reliable resilient router of the present invention realizes active detection of a lost data packet and a single or batch retransmission mechanism, so that the lost data packet can be directly recovered in the grid from an upstream router through which the lost data packet passes, which improves the recovery time success rate and the high efficiency of the lost data packet, and guarantees the safe and stable operation of the wide-area phasor measurement system of the power grid.

6 Claims, 3 Drawing Sheets

(56) References Cited

FOREIGN PATENT DOCUMENTS

| | | | |
|---|---|---|---|
| CN | 108574690 A | | 9/2018 |
| CN | 108650070 A | | 10/2018 |
| CN | 112910089 A | * | 6/2021 |
| CN | 112994233 A | * | 6/2021 |
| CN | 113507130 A | * | 10/2021 |

OTHER PUBLICATIONS

First Office Action(202110144836.9); dated Mar. 23, 2021.
Notice of Allowance(202110144836.9); dated Apr. 30, 2021.

* cited by examiner

RELIABLE RESILIENT ROUTER FOR WIDE-AREA PHASOR MEASUREMENT SYSTEM OF POWER GRID

CROSS-REFERENCE TO RELATED APPLICATIONS

The present application is a continuation of International Application No. PCT/CN2021/075891, filed on Feb. 7, 2021, which claims priority to Chinese Application No. 202110144836.9, filed on Feb. 3, 2021, the contents of both of which are incorporated herein by reference in their entireties.

TECHNICAL FIELD

The present invention belongs to the technical field of reliable communication for a wide-area phasor measurement system of a power grid, and specifically relates to a reliable resilient router for a wide-area phasor measurement system of a power grid.

BACKGROUND

In a modern power grid, a large number of phasor measurement units (PMUs) are deployed in substations and distribution grids, so as to monitor power grid lines and transformers. The data collected by the PMU is usually transmitted through the IEEE C37.118.2 or IEC61850-9-2 protocol to a phasor data concentrator (Phasor Data Concentrator, PDC), the collection frequency can reach 10-60 times per second, and the end-to-end data transmission delay requires between 35-50 ms. The data sampled by the PDC is critical to the correctness of state estimation of a power grid monitoring and data collection system (SCADA).

However, the problem of data packet loss caused by link failure and grid congestion is unavoidable. Fast retransmission recovery of a data packet is the key to ensuring the delivery of the data packet on schedule. The retransmission control of TCP (Transmission Control Protocol) is utilized in the prior art, but its retransmission success rate is affected by the loss of an acknowledgement data packet (Acknowledgement, ACK) and a retransmission data packet; and its estimation time of the lost data packet and the transmission time of TCP sending end and receiving end will seriously increase the end-to-end data transmission delay, affect the state estimation and protection actions of SCADA, and then destroy the safe and stable operation of the power grid. Therefore, achieving the high success rate and high efficiency of retransmission for the lost data packet is a key issue to ensure the qualified measurement and control between the PMU and the PDC.

SUMMARY

In view of the problems in the prior art, the present invention provides a reliable resilient router for a wide-area phasor measurement system of a power grid. The invention improves the success rate and efficiency of the retransmission of the above-mentioned lost data packet, and with the fully consideration on the application characteristics of the wide-area phasor measurement system of the power grid.

In order to achieve the above-mentioned purpose, the present invention adopts the following technical solutions: a reliable resilient router for a wide-area phasor measurement system of a power grid, including a Data-type data packet processing module, a RetransReq data packet processing module, a RetransReport data packet processing module, a basic data packet processing module, a multi-path forwarding state table module, a content storage queue module and a physical port.

Upon receiving a RetransReq data packet, the basic data packet processing module transmits the RetransReq data packet to the RetransReq data packet processing module, the RetransReq data packet processing module firstly calls the content storage queue module to acquire a Data-type data packet that matches the RetransReq data packet, if the Data-type data packet is matched, the RetransReq data packet processing module calls the multi-path forwarding state table module to acquire the matched physical port of a next hop, and sends the matched Data-type data packet to the physical port of the next hop.

After receiving the Data packet, the basic data packet processing module calls the Data-type data packet processing module, and if it is discovered that the Data-type data packet is lost, the basic data packet processing module firstly sends a RetransReport data packet, and then sends the RetransReq data packet; and calls the multi-path forwarding state table module to query the physical port of the next hop, and sends the Data-type data packet out from the physical port.

Upon receiving the RetransReport data packet, the basic data packet processing module transmits the RetransReport data packet to the RetransReport data packet processing module, calls the multi-path forwarding state table module to query the physical port of the next hop, and sends the RetransReport data packet to the physical port of the next hop.

Further, the working process of the Data-type data packet processing module is:

(1) if the data type of the Data-type data packet is original data, skipping to step (3); otherwise, if the Data ID of the Data-type data packet is recorded in a Data ID set of a data packet that has been forwarded, ending the working process of the Data-type data packet processing module, and otherwise adding the Data ID of the Data-type data packet into the Data ID set of the data packet that has been forwarded;

(2) if the data type of the Data-type data packet is single retransmission, clearing the Data ID of the Data-type data packet from a Data ID set of a data packet that is waiting and a Data ID set of a data packet that is waiting for single retransmission; otherwise, clearing the Data ID of the Data-type data packet from a Data ID set of a data packet that is waiting for batch retransmission; then skipping to step (9);

(3) extracting the Data ID from the Data-type data packet, querying whether the Data ID exists in a first-in first-out queue, if so, not performing the following steps, and otherwise adding the Data ID into the first-in first-out queue;

(4) checking whether the Data ID of the Data-type data packet exists in the Data ID set of a lost data packet reported by an upstream router of the current router, if so, removing the Data ID of the Data-type data packet and skipping to step (8); otherwise, executing step (5);

(5) if the difference between the Data ID of the Data-type data packet and the Data ID forwarded by the router at last exceeds 2, calculating a Data ID set that is not retransmitted recently, calculating a Data ID set that needs to send a batch retransmission request, and deleting the Data ID set that is not retransmitted recently from an event ID set that is waiting for the arrival of a next data packet;

(6) if the size of the Data ID set that is not retransmitted recently is greater than 0, packaging the Data ID set that is not retransmitted recently into a RetransReport data packet, and sending the RetransReport data packet to a next hop router of a primary path in the multi-path forwarding state table module; then, sending the RetransReq data packet along a redundant sub-path of the current router and an upstream path of the primary path in a forwarding item of the multi-path forwarding state table module, and setting the Data ID set of the RetransReport data packet requesting for retransmission as the Data ID set that is not retransmitted recently; setting the retransmission type thereof as batch; setting a retransmission request ID as a unique value, then querying the multi-path forwarding state table module to find the physical port of a downstream router node of the primary path in the multi-path forwarding state table module according to a reliable resilient router subgraph ID of the RetransReport data packet and the ID of the primary path in the multi-path forwarding state table module, and sending and carrying the RetransReq data packet;

(7) if the Data ID of the Data-type data packet is greater than the Data ID forwarded by the router at last, updating the Data ID forwarded by the router at last to the Data ID of the Data-type data packet;

(8) deleting the Data-type data packet from the event ID set that is waiting for the arrival of the next data packet and a RetransReq event ID set that is waiting for single data packet retransmission feedback;

(9) querying the physical port of the downstream router of the primary path in the forwarding item of the multi-path forwarding state table module, if the physical port can be queried, forwarding the Data-type data packet from the physical port; if the physical port is not queried, forwarding the Data-type data packet to a phasor data concentrator;

(10) if the Data ID of the Data-type data packet is equal to the Data ID forwarded by the router at last, assigning the minimum value that is no in the Data ID set of the lost data packet reported by the upstream router, starting from the Data ID of a Data-type data packet that is recently forwarded plus 1, to the Data ID that is waiting for the next arriving data packet, and calculating the maximum delay of waiting for the next data packet: $\tau_{next}=(\delta_{next}-\delta_{recent})\times(piat_{max}+\tau_{upstream})$, where $\delta_{next}$ represents the Data ID that is waiting for the next arriving data packet, $\delta_{recent}$ represents the Data ID of the Data-type data packet that is recently forwarded, $piat_{max}$ represents the maximum interval time between two consecutive measurement data packets sent by the phasor measurement unit, and $\tau_{upstream}$ represents the maximum value of uplink transmission delay between the router and its adjacent upstream router; and

(11) starting a timing scheduled task event by the router, delaying the execution of the timing scheduled task event for $\tau_{next}$, and if the event ID set that is waiting for the arrival of the next data packet is removed, terminating the execution of the task.

Further, the working process of the RetransReq data packet processing module is:

(1) extracting a data ID set requesting for retransmission from the RetransReq data packet, for each Data ID requesting for retransmission, searching for the most matched data packet in the content storage queue module, and if a query value is empty, then ending this process; and (2) extracting a retransmission type from the data packet as batch or single, packaging the matched data packet into a new Data-type data packet, assigning a corresponding communication pair, a redundant sub-path corresponding to an entrance port, a retransmission type and the Data ID of the matched data packet to the RSG ID, Path ID, data type and Data ID thereof, respectively, setting a Transient tag, and sending the Transient tag back to an entrance physical port of the data packet.

Further, the working process of the RetransReport data packet processing module is:

(a) extracting a Data ID set from the RetransReport data packet, recording the Data ID set as the Data ID set of a newly discovered lost data packet, when the Data ID of the newly discovered lost data packet is greater than 0, merging the Data ID of the newly discovered lost data packet into the Data ID set of the RetransReport data packet of the upstream router of the current router, and the Data ID that is waiting for the next arriving data packet is −1; otherwise, skipping to step (d);

(b) for each data packet that exists in the Data ID set of the RetransReport data packet of the upstream router of the current router, if the data packet exists in the event ID set that is waiting for the arrival of the next data packet, removing the data packet from the event ID set that is waiting for the arrival of the next data packet and the RetransReq event ID set that is waiting for the single data packet retransmission feedback, and updating the Data ID that is waiting for the next arriving data packet to the maximum value of the Data ID that is waiting for the next arriving data packet and the Data ID of an arriving data packet; then, removing the Data ID of the arriving data packet from the Data ID set of the data packet that is waiting for batch retransmission;

(c) if the Data ID that is waiting for the next arriving data packet is not equal to −1, assigning the $\delta_{next}$ the minimum value that is not in $\delta_{losts}$ starting from $\delta_{recent}+1$, and calculating the maximum delay of waiting for the next data packet: $\tau_{next}=(\delta_{next}-\delta_{recent})\times(piat_{max}+\tau_{upstream})$; and then, starting a timing scheduled task event by the router, delaying the execution of the task for $\tau_{next}$, and if the timing scheduled task event is removed, terminating the execution of the timing scheduled task event; and (d) querying the physical port of the next hop router on the primary path in the forwarding item of the multi-path forwarding state table module, and forwarding the RetransReport data packet from the physical port.

Further, the working process of the basic data packet processing module is:

(1) if the router is a node on the redundant sub-path and a node on a non-primary path, according to a path ID and a forwarding direction of the data packet, querying a corresponding forwarding item in the multi-path forwarding state table module, if the forwarding item is not empty, labeling the data packet with a Transient tag, and sending the data packet out from the physical port corresponding to the queried forwarding item;

(2) if the packet is not labeled with the Transient tag, storing the data packet in the content storage queue;

(3) if the data packet is not a data packet that is forwarded on the primary path in the forwarding item of the multi-path forwarding state table module, according to the path ID and the forwarding direction of the data packet, querying a corresponding forwarding item in a local forwarding table, if the forwarding item is not empty, labeling the data packet with the Transient tag, and sending the data packet out from the physical port corresponding to the queried forwarding item; and (4) if an operator of the data packet is Data, calling the Data-type data packet processing module; if the operator of the data packet is RetransReq, calling the RetransReq data packet processing module; and if the operator of the data packet is RetransReport, calling the RetransReport data packet processing module.

Further, the working process of the content storage queue module is:

(1) under initial conditions, initializing a first-in-first-out queue locally, and the size of each unit in the queue is not less than the maximum value of the size of the data packet;

(2) when there is a data packet storage request, pushing the data packet to the end of the first-in-first-out queue, and if the first-in-first-out queue is full, removing a head element of the first-in-first-out queue before the above pushing operation in the step (2); and (3) when there is a Data ID query request of the data packet, searching for the Data ID of the data packet that most matches the Data ID of the data packet in the first-in first-out queue, and returning the matched data packet to a requester; and if no matched data packet is found, returning a null value.

Further, the multi-path forwarding state table module is composed of multiple forwarding rule items and a forwarding state set corresponding to the reliable resilient router subgraph ID.

Compared with the prior art, the present invention has the following beneficial effects: the reliable resilient router of the present invention realizes rapid detection of the lost data packet and multi-path rapid retransmission of the lost data packet in the grid, the detection process is completed on the router serving as a receiving party, the speed is higher, and the multiple redundant sub-paths can avoid problems such as link failure encountered during retransmission, and improve the recovery efficiency of the data packet. In contrast, a traditional router does not have the retransmission ability of the lost data packet, the lost data packet of the transmission control protocol (Transmission Control Protocol, TCP) is implemented on a sending party, the detection of the lost data packet depends on the guessing of concessive data packets in response to loss, the guessing time is longer, the retransmission must start at the sending end, and the retransmission path and the retransmission time are both longer; once a grid link fails, the TCP retransmission will also fail, resulting in that the data packet cannot be recovered. The present invention can improve the communication reliability of the wide-area phasor measurement system of the power grid, efficiently solve the rapid retransmission recovery of the lost data packet, improve the retransmission success rate, meet the hash requirements of control service communication, and ensure the safe operation of the power grid.

DESCRIPTION OF EMBODIMENTS

A data packet ($\xi$) of the present invention adopts a unified data frame structure, including the following members: a communication node pair ID, a path ID (Path ID), a transient tag (Transient Tag), an operator and a data content, and the data frame can be located on a link layer, a grid layer or a transport layer in an existing packet switching grid.

Figure 1:
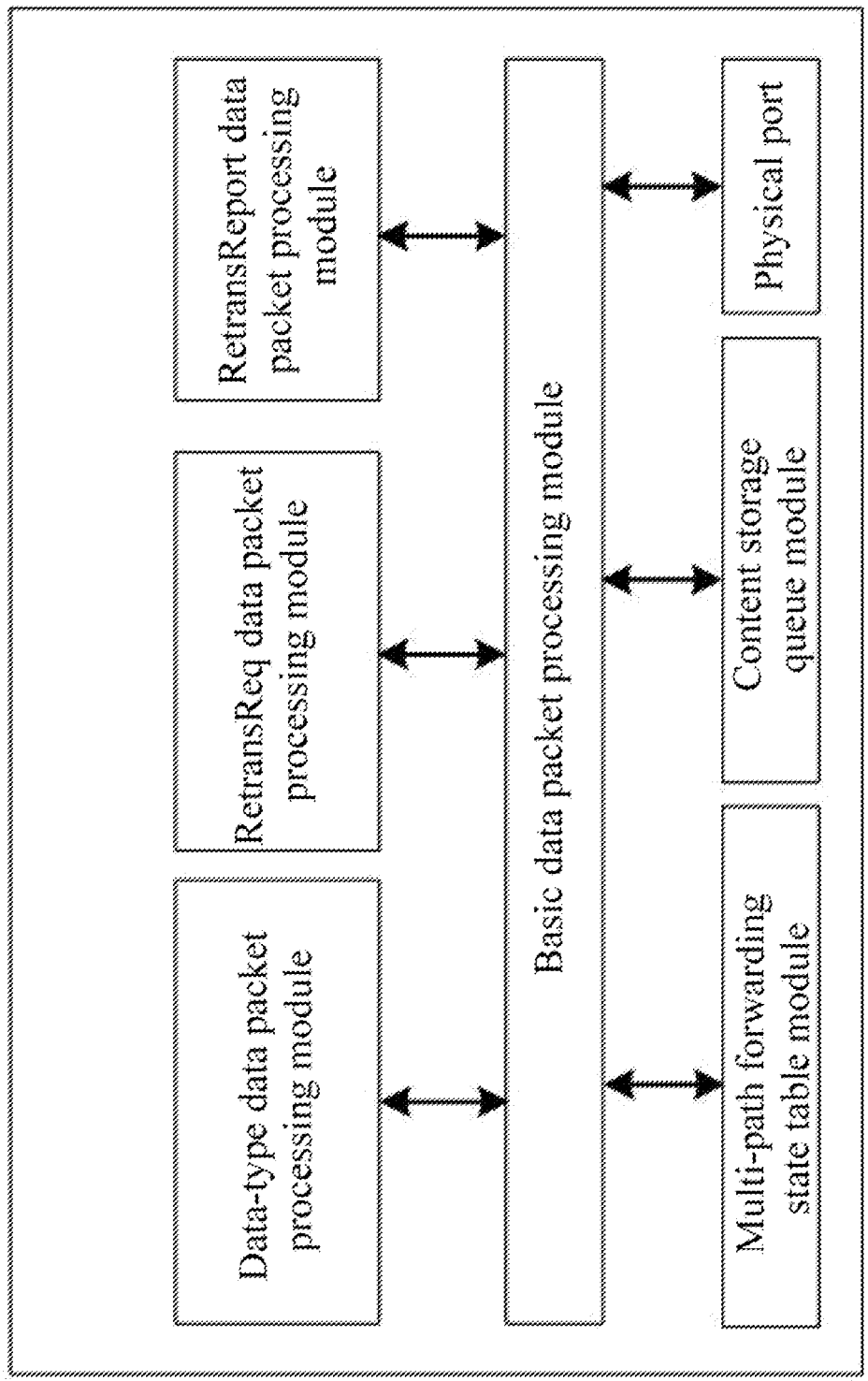
FIG. 1 is a schematic diagram of a reliable resilient router for a wide-area phasor measurement system of a power grid in the present invention.

As shown in FIG. 1, it is a schematic diagram of a reliable resilient router for a wide-area phasor measurement system of a power grid in the present invention. The reliable resilient router includes a Data-type data packet processing module, a RetransReq data packet processing module, a RetransReport data packet processing module, a basic data packet processing module, a multi-path forwarding state table module, a content storage queue module and a physical port; and when the operator is RetransReq, the data frame is used for carrying relevant information of a retransmission request, and the corresponding data content includes: a data ID set requesting for retransmission (denoted as $\Delta_{req}$), a retransmission type (single/batch), and a batch retransmission ID. Upon receiving a RetransReq data packet, the basic data packet processing module transmits the RetransReq data packet to the RetransReq data packet processing module, the RetransReq data packet processing module firstly calls the content storage queue module to acquire a Data-type data packet that matches the RetransReq data packet, if the Data-type data packet is matched, the RetransReq data packet processing module calls the multi-path forwarding state table module to acquire the matched physical port of the next hop, and sends the matched Data-type data packet to the physical port of the next hop.

When the operator is Data, the data frame is used for carrying original/retransmitted PMU measurement data, and the corresponding data content includes: $\delta(\xi)$, a data type, a batch retransmission ID and a load. The load part is used for carrying the measurement data of the PMU; and the data type includes three types: original data, single retransmission and batch retransmission. After receiving the Data-type data packet, the basic data packet processing module calls the Data-type data packet processing module, and if it is discovered that the Data-type data packet is lost, the basic data packet processing module firstly sends a RetransReport data packet, and then sends the RetransReq data packet; and calls the multi-path forwarding state table module to query the physical port of the next hop, and sends the Data-type data packet out from the physical port.

When the operator is RetransReport, the data packet is used for carrying a retransmission request condition of an upstream router node, and the corresponding data content includes: the data ID set ($\Delta_{req}$) requesting for retransmission and a source router ID. Upon receiving the RetransReport data packet, the basic data packet processing module transmits the RetransReport data packet to the RetransReport data packet processing module, calls the multi-path forwarding state table module to query the physical port of the next hop, and sends the RetransReport data packet to the physical port of the next hop.

The reliable resilient router (Resilient routes, RR) includes two parts: ① a primary path (Primary Path, PP), which passes through b routers, denoted as $PP=(r_{d_1}, \ldots, r_{d_i}, r_{d_{i+1}}, r_{d_b})$, where $r_{d_i}$ represents the dith router; and ② for a certain router in P, β upstream nodes can be interconnected with it, denoted as $(r_{x_1}, \ldots, r_{x_s}, \ldots, r_{x_\beta})$, and the path between the router $r_{x_s}$ and the router $r_{d_i}$ is called a redundant sub-path (Redundant Sub-Path, RSP).

Figure 2:
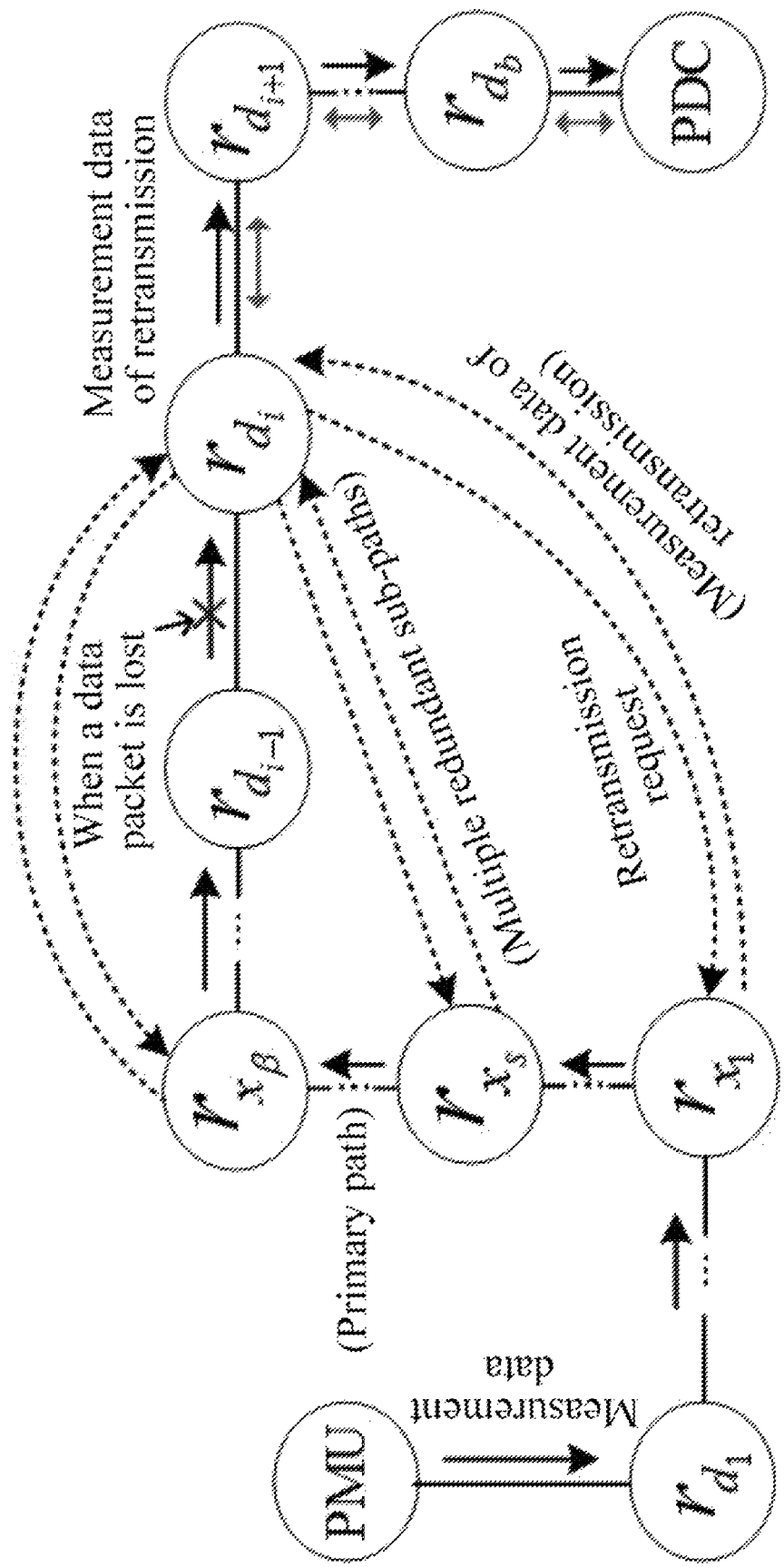
FIG. 2 is a schematic diagram of an intra-grid retransmission process of the reliable resilient router.

The multi-path forwarding state table module (Forwarding State Table, FST) is composed of multiple forwarding rule items and a forwarding state set corresponding to a reliable resilient router subgraph ID. Each forwarding item is composed of the following members: ① RR subgraph ID (RR Subgraph ID, RSGID), which represents a communication pair of a PMU and a PDC; ② a path ID (Path ID), which is unique and represents the above-mentioned PP or RSP; ③ forwarding direction, the value of which is upstream or downstream, the downstream represents a direction from the PMU to the PDC, and the upstream is opposite to downstream; and ④ and the ID of an output grid port of the router. The forwarding state set corresponding to each RSGID includes the following members: ① Data ID forwarded by the router at last; ② a first-in-first-out queue whose value set is composed of the forwarded Data ID; ③ a Data ID set, which represents a Data ID set of a lost data packet reported by the upstream router of the current router PP; ④ an event ID set that is waiting for the arrival of the next data packet; ② a RetransReq event ID set that is waiting for single data packet retransmission feedback; and ⑥ a RetransReq event ID set that is waiting for batch data packet retransmission feedback. FIG. 2 shows a schematic diagram of an intra-grid retransmission process between multiple reliable resilient routers in the present invention. A primary path is established between the PMU and the PDC, namely PP=(PMU, $r_{d_1}$, ..., $r_{x_1}$, ..., $r_{x_2}$, ..., $r_{x_\beta}$, ..., $r_{d_{j-1}}$, $r_{d_j}$, $r_{d_{j+1}}$, ..., $r_{d_b}$, PDC). When there are $\beta$ RSPs to reach the upstream router of $r_{d_j}$, that is, $(r_{x_1}, ..., r_{x_2}, ..., r_{x_\beta})$, when $r_{d_j}$ detects data packet loss from a previous hop router, that is, $r_{d_{j-1}}$, $r_{d_j}$ will send a retransmission request (RetransReq) data packet to its upstream router, any upstream router sends a retransmitted measurement Data-type data packet to $r_{d_j}$ along the RSP path, after receiving the retransmitted data packet, $r_{d_j}$ forwards the earliest arriving data packet to the next hop router at its downstream, that is $r_{d_{j+1}}$, and the above process is described in detail as follows:

The working process of the Data-type data packet processing module is:

(1) if the data type of the Data-type data packet is original data, skipping to step (3); otherwise, if the Data ID of the Data-type data packet is recorded in a Data ID set of a data packet that has been forwarded, ending the working process of the Data-type data packet processing module, and otherwise adding the Data ID of the Data-type data packet into the Data ID set of the data packet that has been forwarded;

(2) if the data type of the Data-type data packet is single retransmission, clearing the Data ID of the Data-type data packet from a Data ID set of a data packet that is waiting and a Data ID set of a data packet that is waiting for single retransmission; otherwise, clearing the Data ID of the Data-type data packet from a Data ID set of a data packet that is waiting for batch retransmission; then skipping to step (9);

(3) extracting the Data ID from the Data-type data packet, querying whether the Data ID exists in a first-in first-out queue, if so, not performing the following steps, and otherwise adding the Data ID into the first-in first-out queue;

(4) checking whether the Data ID of the Data-type data packet exists in the Data ID set of a lost data packet reported by an upstream router of the current router, if so, removing the Data ID of the Data-type data packet and skipping to step (8); otherwise, executing step (5); the step avoids the repeated transmission of the same retransmission request data packet;

(5) if the difference between the Data ID of the Data-type data packet and the Data ID forwarded by the router at last exceeds 2, calculating a Data ID set that is not retransmitted recently, calculating a Data ID set that needs to send a batch retransmission request, and deleting the Data ID set that is not retransmitted recently from an event ID set that is waiting for the arrival of the next data packet;

(6) as shown in FIG. 2, if the size of the Data ID set that is not retransmitted recently is greater than 0, packaging the Data ID set that is not retransmitted recently into a RetransReport data packet, and sending the RetransReport data packet to a next hop router of the primary path in the multi-path forwarding state table module; then, sending the RetransReq data packet along $\beta$ redundant sub-paths of the current router and an upstream path of the primary path in the forwarding item of the multi-path forwarding state table module, and setting the Data ID set of the RetransReport data packet requesting for retransmission as the Data ID set that is not retransmitted recently; setting the retransmission type thereof as batch; setting a retransmission request ID as a unique value, and the setting method can be self-increment, decreasing value, random value, etc. Then, querying the multi-path forwarding state table module to find the physical port of a downstream router node of the primary path in the multi-path forwarding state table module according to the RSG ID and the PP ID of the RetransReport data packet, and sending and carrying the RetransReq data packet;

(7) if the Data ID of the Data-type data packet is greater than the Data ID forwarded by the router at last, updating the Data ID forwarded by the router at last to the Data ID of the Data-type data packet;

(8) deleting the Data-type data packet from the event ID set that is waiting for the arrival of the next data packet and a RetransReq event ID set that is waiting for single data packet retransmission feedback;

(9) querying the physical port of the downstream router of the primary path in the forwarding item of the multi-path forwarding state table module, if the physical port can be queried, forwarding the Data-type data packet from the physical port; if the physical port is not queried, forwarding the Data-type data packet to a phasor data concentrator;

(10) if the Data ID of the Data-type data packet is equal to the Data ID forwarded by the router at last, assigning the minimum value that is no in the Data ID set of the lost data packet reported by the upstream router, starting from the Data ID of a Data-type data packet that is recently forwarded plus 1, to the Data ID that is waiting for the next arriving data packet, and calculating the maximum delay of waiting for the next data packet: $\tau_{next}=(\delta_{next}-\delta_{recent})\times(piat_{max}+\tau_{upstream})$, where $\delta_{next}$ represents the Data ID that is waiting for the next arriving data packet, $\delta_{recent}$ represents the Data ID of the Data-type data packet that is recently forwarded, $piat_{max}$ represents the maximum interval time between two consecutive measurement data packets sent by the phasor measurement unit, and $\tau_{upstream}$ represents the maximum value of uplink transmission delay between the router and its adjacent upstream router; and

(11) starting a timing scheduled task event by the router, delaying the execution of the timing scheduled task event for $\tau_{next}$, and if the event ID set that is waiting for the arrival of the next data packet is removed, terminating the execution of the task. The execution of the task includes two steps: firstly, by means of searching for the next hop port exit at the downstream of the PP in the FST forwarding table, sending a RetransReport message that carries the information of the Data ID that is waiting for the next arriving data packet to the next hop exit; and then, sending a retransmission request of the RetransReq data packet along $\beta$ RSPs and the upstream path of the PP, the retransmission type in the data packet is single, the data ID set requesting for retransmission is the Data ID that is waiting for the next arriving data packet, and the batch retransmission ID is a null value.

The working process of the RetransReq data packet processing module is:

(1) extracting the data ID set requesting for retransmission from the RetransReq data packet, for each Data ID requesting for retransmission, searching for the most matched data packet in the content storage queue module, and if a query value is empty, then ending the working process of the RetransReq data packet processing module; and (2) extracting a retransmission type from the data packet as batch or single, packaging the matched data packet into a new Data-type data packet, assigning a corresponding communication pair, a redundant sub-path corresponding to an entrance port, a retransmission type and the Data ID of the matched data packet to the RSGID, Path ID, data type and Data ID thereof, respectively, setting a Transient tag, and sending the Transient tag back to an entrance physical port of the data packet.

The working process of the RetransReport data packet processing module is:

(1) extracting a Data ID set from the RetransReport data packet, recording the Data ID set as the Data ID set of a newly discovered lost data packet, when the Data ID of the newly discovered lost data packet is greater than 0, merging the Data ID of the newly discovered lost data packet into the Data ID set of the RetransReport data packet of the upstream router of the current router, the Data ID that is waiting for the next arriving data packet is −1; otherwise, skipping to step (4);

(2) for each data packet that exists in the Data ID set of the RetransReport data packet of the upstream router of the current router, if the data packet exists in the event ID set that is waiting for the arrival of the next data packet, removing the data packet from the event ID set that is waiting for the arrival of the next data packet and the RetransReq event ID set that is waiting for the single data packet retransmission feedback, and updating the Data ID that is waiting for the next arriving data packet to the maximum value of the Data ID that is waiting for the next arriving data packet and the Data ID of an arriving data packet; then, removing the Data ID of the arriving data packet from the Data ID set of the data packet that is waiting for batch retransmission;

(3) if the Data ID that is waiting for the next arriving data packet is not equal to −1, assigning the $\delta_{next}$ the minimum value that is not in $\Delta_{losts}$ starting from $\delta_{recent}+1$, and calculating the maximum delay of waiting for the next data packet: $\tau_{next}=(\delta_{next}-\delta_{recent})\times(piat_{max}+\tau_{upstream})$; and then, starting a timing scheduled task event by the router, delaying the execution of the task for $\tau_{next}$, and if the timing scheduled task event is removed, terminating the execution of the timing scheduled task event. The execution of the scheduled task event includes two steps: firstly, by means of searching for the next hop port exit at the downstream of the PP in the FST forwarding table, sending a RetransReport message that carries the information of the Data ID that is waiting for the next arriving data packet to the next hop exit; and then, sending a retransmission request of the RetransReq data packet along β RSPs and the upstream path of the PP, the retransmission type in the data packet is single, a data ID set requesting for retransmission is the Data ID that is waiting for the next arriving data packet, and the batch retransmission ID is a null value; and (4) querying the physical port of the next hop router on the primary path in the forwarding item of the multi-path forwarding state table module, and forwarding the RetransReport data packet from the physical port.

The working process of the basic data packet processing module is:

(1) if the router is a node on the redundant sub-path and a node on a non-primary path, according to the path ID and the forwarding direction of the data packet, querying a corresponding forwarding item in the multi-path forwarding state table module, if the forwarding item is not empty, labeling the data packet with a Transient tag, and sending the data packet out from the physical port corresponding to the queried forwarding item; and finally ending the working process of the basic data packet processing module.

(2) if the packet is not labeled with the Transient tag, storing the data packet in the content storage queue;

(3) if the data packet is not a data packet that is forwarded on the primary path in the forwarding item of the multi-path forwarding state table module, according to the path ID and the forwarding direction of the data packet, querying a corresponding forwarding item in a local forwarding table, if the forwarding item is not empty, labeling the data packet with the Transient tag, and sending the data packet out from the physical port corresponding to the queried forwarding item; and (4) if the operator of the data packet is Data, calling the Data-type data packet processing module; if the operator of the data packet is RetransReq, calling the RetransReq data packet processing module; and if the operator of the data packet is RetransReport, calling the RetransReport data packet processing module.

The working process of the content storage queue module is:

(1) under initial conditions, initializing a first-in-first-out queue locally, the size of each unit in the queue is not less than the maximum value of the size of the data packet; and the first-in-first-out queue can be implemented on the basis of any manner such as an SRAM, a DRAM, an SSD or a magnetic disk;

(2) when there is a data packet storage request, pushing the data packet to the end of the first-in-first-out queue, and if the first-in-first-out queue is full, removing a head element of the first-in-first-out queue before the above pushing operation in the step (2), so as to ensure that the size of the queue is determined; and (3) when there is a Data ID query request of the data packet, searching for the Data ID of the data packet that most matches the Data ID of the data packet in the first-in first-out queue, and returning the matched data packet to a requester; and if no matched data packet is found, returning a null value.

EMBODIMENT

Figure 3:
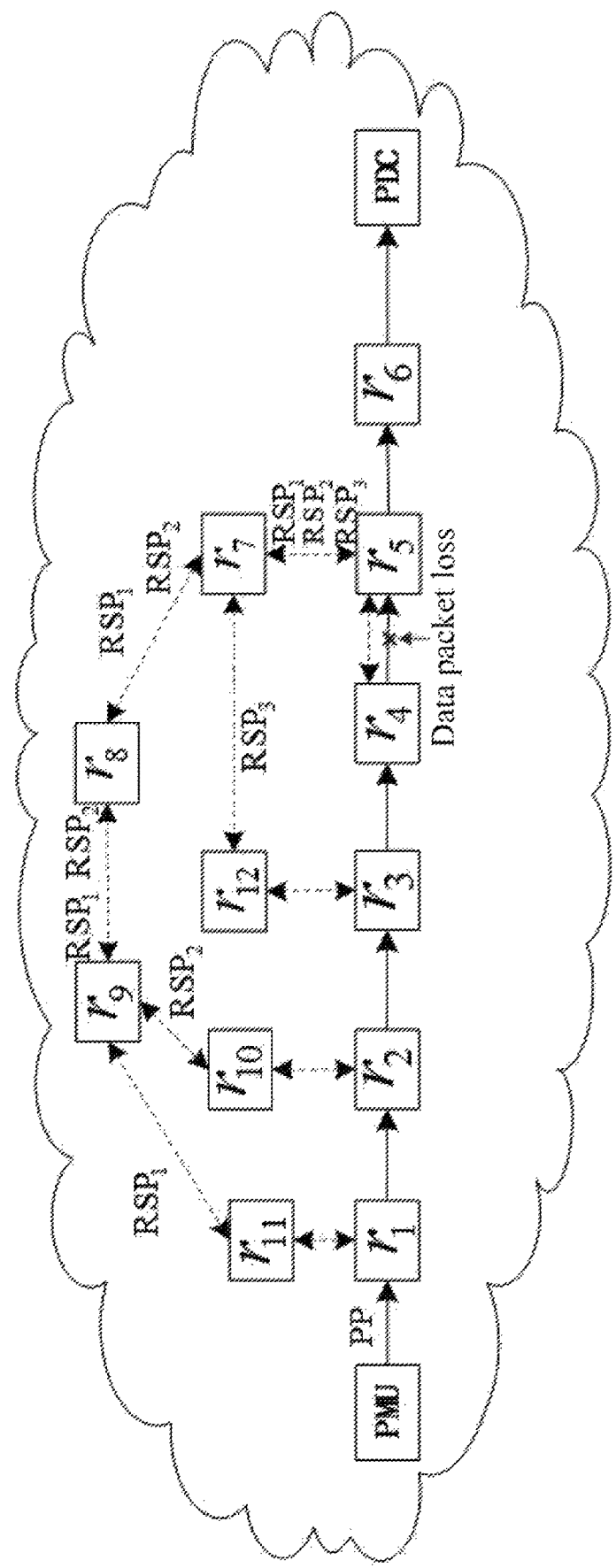
FIG. 3 is a diagram of a communication process of the reliable resilient router in the wide-area phasor measurement system.

FIG. 3 shows a schematic diagram of a deployment and communication process of the reliable resilient router in the existing PMU and PDC device communication grid, and the end-to-end communication between the PMU and the PDC is implemented by 11 reliable resilient routers involved in the present invention. The RR between communication pairs formed by the PMU and the PDC is established as follows: firstly, a PP path is $(r_1, r_2 \ldots, r_6)$; secondly, for a router $r_5$ therein, $r_5$ respectively establishes three RSP paths with the three upstream routers on the PP: ① $RSP_1=(r_5, r_7, r_8, r_9, r_{11}, r_1)$; ② $RSP_2=(r_5, r_7, r_8, r_9, r_{10}, r_2)$; and ③ $RSP_3=(r_5, r_7, r_{12}, r_3)$. The link between $r_5$ and $r_7$ shares $RSP_1$, $RSP_2$ and $RSP_3$, and the two links between $r_7$ and $r_8$, and between $r_8$ and $r_9$ share $RSP_1$ and $RSP_2$. The forwarding items of FST generated by the multi-path forwarding state table module on $r_5$ are shown in Table 1, the forwarding items of the FST on $r_1$ are shown in Table 2, the forwarding items of the FST on $r_7$ are shown in Table 3, and the forwarding items of the rest of the routers are generated similar to the above three examples, so no repeated description is given herein. At the same time, under the initial conditions, all forwarding states of the FST are set to be empty.

TABLE 1

Forwarding items of the FST on $r_5$

| Serial number | RSGID | Path ID | Forwarding direction | Output port ID |
|---|---|---|---|---|
| 1 | 0 | PP | Downstream | Port arriving at $r_6$ |
| 2 | 0 | PP | Upstream | Port arriving at $r_4$ |
| 3 | 0 | $RSP_1$ | Upstream | Port arriving at $r_7$ |
| 4 | 0 | $RSP_2$ | Upstream | Port arriving at $r_7$ |
| 5 | 0 | $RSP_3$ | Upstream | Port arriving at $r_7$ |

TABLE 2

Forwarding items of the FST on $r_1$

| Serial number | RSGID | Path ID | Forwarding direction | Output port ID |
|---|---|---|---|---|
| 1 | 0 | PP | Downstream | Port arriving at $r_2$ |
| R12 | 0 | $RSP_1$ | Downstream | Port arriving at $r_{11}$ |

TABLE 3

Forwarding items of the FST on $r_7$

| Serial number | RSGID | Path ID | Forwarding direction | Output port ID |
|---|---|---|---|---|
| 1 | 0 | $RSP_1$ | Upstream | Port arriving at $r_5$ |
| 2 | 0 | $RSP_2$ | Upstream | Port arriving at $r_5$ |
| 3 | 0 | $RSP_3$ | Upstream | Port arriving at $r_5$ |
| 4 | 0 | $RSP_1$ | Downstream | Port arriving at $r_8$ |
| 5 | 0 | $RSP_2$ | Downstream | Port arriving at $r_8$ |
| 6 | 0 | $RSP_3$ | Downstream | Port arriving at $r_{12}$ |

Based on the above RR, the collaboration mode of the six modules in the present invention is explained. Assuming that a data stream from the PMU to the PDC can be formally defined as: $\Xi=(\xi_1, \xi_2, \ldots, \xi_{i-1}, \xi_i, \ldots)$, where $\xi_i$ represents the ith data packet sent by the PMU, before the PMU sends $\xi_i$, under the initial conditions, the RSGID, the Path ID and the data type of $\xi_i$ are respectively marked as corresponding communication pair, PP and original, and its Data ID is self-increment, which is initially a certain positive integer value, and will be incremented by 1 after each transmission. In this way, when a data packet $\xi_i$ is lost on the link between $r_4$ and $r_5$ at the moment t, at the same time, at the moment t−τ, where τ is a constant, $r_1$, $r_2$, $r_3$ and $r_4$ all receive $\xi_i$, and forward and process the same, and from the moment t−τ to the moment t, the processing process of the reliable resilient router is as follows:

(1) for the upstream routers $r_1$, $r_2$, $r_3$ and $r_4$ on $r_5$, since $r_5$ is a node on the PP, it is judged whether the retransmission type is single retransmission during the execution, and if so, the Data ID of the Data-type data packet is cleared from the Data ID set of the data packet that is waiting and the Data ID set of the data packet that is waiting for single retransmission; or otherwise, the Data ID of the Data-type data packet is cleared from the Data ID set of a data packet that is waiting for batch retransmission. Then, the $\xi_i$ is stored in a local content storage queue $Q_{cs}$. Afterwards, the Data ID is extracted from $\xi_i$, it is queried whether the Data ID exists in the first-in first-out queue, if so, it means that the data packet has been forwarded, then no subsequent step is performed, or otherwise, the Data ID is added into the first-in first-out queue. According to the RSG ID and the Path ID of $\xi_i$, the above four routers respectively query the corresponding exit addresses, for example, in Table 1, $r_1$ searches for an exit address located in the first entry, that is, the exit address of $r_2$. Finally, it is checked whether the Data ID of $\xi_i$ is in the Data ID set of the lost data packet reported by the upstream router of the current router, which is divided into two situations: one situation is that the Data ID is in the set, then the Data ID of the Data-type data packet is removed, and the Data ID of $\xi_i$ is deleted from the event ID set that is waiting for the arrival of the next data packet and the RetransReq event ID set that is waiting for single data packet retransmission feedback. The other situation is that the Data ID is not in the set, at this time, if the difference between the Data ID of the Data-type data packet and the Data ID forwarded by the router at last exceeds 2, the Data ID set that is not retransmitted recently is calculated, the Data ID set that needs to send the batch retransmission request is calculated, and the Data ID set that is not retransmitted recently is deleted from the event ID set that is waiting for the arrival of the next data packet. The above two situations are to avoid the repeated transmission of the same retransmission request (RetransReq) packet.

(2) When $r_1$, $r_2$, $r_3$ and $r_4$ receive $\xi_i$, since the data type is original data, the Data ID is extracted from $\xi_i$, it is queried whether the Data ID exists in the first-in first-out queue, if so, the process is ended, or otherwise, the Data ID is added into the first-in first-out queue. Firstly, it is judged whether the Data ID of the data packet is recorded in the Data ID set of the data packet that has been forwarded, if the data packet is a repeatedly transmitted data packet, the data packet is directly discarded, and the following steps are not performed; otherwise, it will be regarded as a new Data-type data packet, at this time, it means that only the Data ID set ($\Delta_{trans}$) of the data packet that has been forwarded only includes the Data ID of $\xi_i$. Since $\delta(\xi_i)$ is not in the Data ID set of the lost data packet reported by the upstream router of the previous router PP, $\xi_i$ is deleted from the event ID set that is waiting for the arrival of the next data packet and the RetransReq event ID set that is waiting for single data packet retransmission feedback, $\delta(\xi_i)$ is removed from the event ID set that is waiting for the arrival of the next data packet and the RetransReq event ID set that is waiting for single data packet retransmission feedback, so as to ensure that all events waiting for the retransmission of $\xi_i$ are terminated; and the RSG ID, the Path ID and a forwarding item matched with a downstream mark are queried in the FST, $\xi_i$ is forwarded, and the above 4 routers respectively forward the $\xi_i$ to $r_2$, $r_3$, $r_4$ and $r_5$ (that is, the next hop router on the PP). At this time, since the link between $r_4$ and $r_5$ is disconnected, $r_5$ does not receive the data packet.

(3) On $r_5$, it is divided into the following two situations. The first situation is that the next data packet waits over time, if waiting for the event ID set that is waiting for the arrival of the next data packet of $\xi_i$ over time, when the data packet $\xi_{i-1}$ is processed and generated, the following steps are performed: firstly, the next Data ID that is expected to be retransmitted (i.e., $\delta_{next}$) is sent to the next hop node (i.e., $r_5$) on the PP through the RetransReport data packet, and then $r_6$ sends the data packet to the next hop of the PP. Then, the RetransReq data packet is sent on total of 4 four paths: $RSP_1$, $RSP_2$, $RSP_3$ and from $r_5$ to $r_4$, then $r_7$ to $r_{11}$ receive the RetransReq data packet, the data packet is assigned by the basic data packet processing module to the RetransReq data packet processing module for processing, because these routers are all located on the RSP, a corresponding exit, that is, the next hop router on the corresponding RSP, can be queried directly in the FST through its RSG ID, Path ID and forwarding direction information. In this way, the Retrans-Req data packet is forwarded to the corresponding router on the PP through each router on the above three RSPs and the PP upstream paths, namely, $r_1$, $r_2$, $r_3$ and $r_4$.

The second situation is that the data packet is found to be lost. If $r_5$ receives $\xi_{i+a}$, where $a \geq 1$, it means that $\xi_i$, $\xi_{i+1}, \ldots, \xi_{i+a-1}$ has been lost, at this time, the "Data-type data packet processing module" executes the following steps: if the difference between the Data ID of $\xi_{i+a}$ and the Data ID forwarded by the router at last exceeds 2, the Data ID set that is not retransmitted recently is calculated, the Data ID set that needs to send the batch retransmission request is calculated, and the Data ID set that is not retransmitted recently is deleted from the event ID set that is waiting for the arrival of the next data packet, $\delta_{recent} = i-1$, therefore $\Delta_{new} = \{i, i+1, \ldots, i+a-1\}$ is calculated; then, $\Delta_{new}$ is packaged into the RetransReport packet, the RetransReport packet is sent to the next hop of PP, that is $r_6$, after receiving the RetransReport packet, $r_6$ forwards the RetransReport packet to the next hop on the PP, and since $r_6$ has no next hop in the FST forwarding rule, it terminates; then, $\Delta_{new}$ is sent out through the RetransReq data packet from $RSP_1$, $RSP_2$, $RSP_3$ and the upstream path of PP, and if $|\Delta_{new}| = 1$, the retransmission type is set as single; otherwise, the retransmission type is set as batch, and at the same time, the retransmission request tag is set as a unique value, such as self-increment for realization. The follow-up is similar to the first situation.

(4) When $r_1$, $r_2$ and $r_3$ receive the RetransReq data packet, the "basic data packet processing module" does not store it, and then allocates it to the "RetransReq data packet processing module" for processing. Specifically, the "content storage queue module" is called by this module at first, because $Q_{cs} = \{\xi_1, \xi_2, \ldots, \xi_i\}$, so $\xi_i$ can be queried as a query result $\xi_m$, and then according to the "RetransReq data packet processing module", $\xi_m$ is packaged into the Data-type data packet, the data type in the Data-type data packet is labeled according to the retransmission type of the RetransReq data packet, at the same time, the Path IDs of the data packet are set as $RSP_1$, RSP2, $RSP_3$ and PP, respectively, and are sent out from entrance ports, namely, $r_{11}$, $r_{10}$, $r_{12}$ and $r_4$.

(5) Upon receiving the RetransReport data packet or the retransmitted Data-type data packet in step (4) above, the routers $r_7$ to $r_{12}$ on the RSP execute the basic data packet processing module, since these routers are all on the RSP and no longer on the PP, then according to the path ID and the forwarding direction of the data packet, the corresponding forwarding item is queried in the multi-path forwarding state table module, and the data packet is forwarded to the next router of the RSP corresponding to the respective FST, and finally arrives at $r_5$.

(6) Upon receiving the RetransReport data packet, according to the "RetransReport data packet processing module", $r_6$ firstly adds $\Delta_{new}$ in the data packet into $\Delta_{losts}$, and at this time, $\Delta_{losts} = \{i, \ldots, i+a-1\}$; then, a related retransmission waiting event is cleared to avoid $r_6$ sending the RetransReq data packet with the same Data ID again; finally, according to the module in step 3, $\tau_{next} = (i+a-i-1) \times (25 \text{ ms} + 2 \text{ ms})$ is calculated, it is assumed here that $piat_{max}$ is 25 ms, considering that when the sampling frequency of the PMU reaches 50 Hz, a corresponding PIAT average value is 20 ms, the presence of a maximum deviation of 5 ms is considered, it is assumed that the maximum total delay of uplink channel transmission of $r_6$ is 2 ms, the above numbers can be set manually, and $\delta_{next}$ is calculated as i+a at the same time; again, a retransmission event task scheduled with a maximum waiting delay of $\tau_{next}$ is added, and the waiting Data ID is $\delta_{next}$ to avoid the retransmission of the data packet; and finally, since its next hop router is empty, the RetransReport will no longer be forwarded.

(7) When $r_5$ receives the retransmitted Data packet $\xi_m$ from $r_{11}$, $r_{10}$ and $r_{12}$ in the fifth step, where $\delta(\xi_m) \in E_{single} \cup E_{batch} = \{i, i+1, \ldots, i+a-1\}$, the "Data-type data packet processing module" will recover the data packet. The process is as follows: first, assuming that $\delta(\xi_m)$ from $r_{12}$ arrives at $r_5$ at first (along $RSP_3$), then $\delta(\xi_m)$ is added into $\Delta_{trans}$, and the $\delta(\xi_m)$ subsequent from $RSP_1$, $RSP_2$ and the upstream path of the PP will be discarded; then, according to the retransmission type $\xi_m$, that is, single or batch, it is respectively determined in a single retransmission event ($\Delta_{next}$ and $\Delta_{single}$) or a batch retransmission event ($\Delta_{batch}$) to clear $\delta(\xi_m)$, so as to avoid the repeated transmission of RetransReq; again, $\xi_m$ is forwarded to the next hop ($r_6$) of the PP, and the lost data packet is forwarded; and finally, $\delta_{next}$ and $\tau_{next}$ are recalculated, and the scheduled task of waiting for the retransmission of the next data packet is started.

(8) $r_6$ can receive the retransmitted Data-type data packet $\xi_m$ sent in step 7 to complete the recovery of the data packet.

By means of the above steps, the lost data packet $\delta_i$ on $r_5$ can be directly recovered on $r_1$, $r_2$ or $r_3$ in the grid, so that even if the link between $r_4$ and $r_5$ fails, it can be ensured that the data packet is recovered, intermediate router nodes on the forwarding path are fully utilized to improve the storage redundancy of the lost data packet in the grid, and the reliability of path transmission is improved by establishing multiple RSPs, the retransmission time is shortened by the active judgment and intra-grid retransmission of the lost data packet, and finally, the high efficiency and success rate of recovery are improved.

It should be noted that when the data compression apparatus provided in the foregoing embodiment performs data compression, division into the foregoing functional modules is used only as an example for description. In an actual application, the foregoing functions can be allocated to and implemented by different functional modules based on a requirement, that is, an inner structure of the apparatus is divided into different functional modules, to implement all or some of the functions described above. For details about a specific implementation process, refer to the method embodiment. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

What is claimed is:

1. A reliable resilient router for a wide-area phasor measurement system of a power grid, comprising a Data-type data packet processing module, a RetransReq data packet processing module, a RetransReport data packet processing module, a basic data packet processing module, a multi-path forwarding state table module, a content storage queue module and a physical port;

wherein upon receiving a RetransReq data packet, the basic data packet processing module transmits the RetransReq data packet to the RetransReq data packet processing module, the RetransReq data packet processing module firstly calls the content storage queue module to acquire a Data-type data packet that matches the RetransReq data packet, and if the Data-type data packet is matched, the RetransReq data packet processing module calls the multi-path forwarding state table module to acquire the matched physical port of a next hop, and sends the matched Data-type packet to the physical port of the next hop;

after receiving the Data-type data packet, the basic data packet processing module calls the Data-type data packet processing module, and if it is discovered that the Data-type data packet is lost, the basic data packet processing module firstly sends a RetransReport data packet, and then sends the RetransReq data packet; and calls the multi-path forwarding state table module to query the physical port of the next hop, and sends the Data-type data packet out from the physical port; and upon receiving the RetransReport data packet, the basic data packet processing module transmits the RetransReport data packet to the RetransReport data packet processing module, calls the multi-path forwarding state table module to query the physical port of the next hop, and sends the RetransReport data packet to the physical port of the next hop;

the working process of the Data-type data packet processing module is:

(1) if the data type of the Data-type data packet is original data, skipping to step (3); otherwise, if a Data Identification (ID) of the Data-type data packet is recorded in a Data ID set of a data packet that has been forwarded, ending the working process of the Data-type data packet processing module, and otherwise adding the Data ID of the Data-type data packet into the Data ID set of the data packet that has been forwarded;

(2) if the data type of the Data-type data packet is single retransmission, clearing the Data ID of the Data-type data packet from a Data ID set of a data packet that is waiting and a Data ID set of a data packet that is waiting for single retransmission; otherwise, clearing the Data ID of the Data-type data packet from a Data ID set of a data packet that is waiting for batch retransmission; then skipping to step (9);

(3) extracting the Data ID from the Data-type data packet, querying whether the Data ID exists in a first-in first-out queue, if there exists the Data ID in the first-in first-out queue, not performing the following steps, and if there does not exist the Data ID in the first-in first-out queue, adding the Data ID into the first-in first-out queue;

(4) checking whether there exists the Data ID of the Data-type data packet in the Data ID set of a lost data packet reported by an upstream router of the current router, if there exists the Data ID of the Data-type data packet in the Data ID set of the lost data packet reported by an upstream router of the current router, removing the Data ID of the Data-type data packet and skipping to step (8); and if there does not exist the Data ID of the Data-type data packet in the Data ID set of the lost data packet reported by the upstream router of the current router, executing step (5);

(5) if the difference between the Data ID of the Data-type data packet and the Data ID forwarded by the router at last exceeds 2, calculating a Data ID set that is not retransmitted recently, calculating a Data ID set that needs to send a batch retransmission request, and deleting the Data ID set that is not retransmitted recently from an event ID set that is waiting for the arrival of a next data packet;

(6) if the size of the Data ID set that is not retransmitted recently is greater than 0, packaging the Data ID set that is not retransmitted recently into a RetransReport data packet, and sending the RetransReport data packet to a next hop router of a primary path in the multi-path forwarding state table module; then, sending the RetransReq data packet along a redundant sub-path of the current router and an upstream path of the primary path in a forwarding item of the multi-path forwarding state table module, and setting the Data ID set of the RetransReport data packet requesting for retransmission as the Data ID set that is not retransmitted recently; setting the retransmission type thereof as batch; setting a retransmission request ID as a unique value, then querying the multi-path forwarding state table module to find the physical port of a downstream router node of the primary path in the multi-path forwarding state table module according to a reliable resilient router subgraph ID (RSGID) of the RetransReport data packet and the ID of the primary path in the multi-path forwarding state table module, and sending and carrying the RetransReq data packet;

(7) if the Data ID of the Data-type data packet is greater than the Data ID forwarded by the router at last, updating the Data ID forwarded by the router at last to the Data ID of the Data-type data packet;

(8) deleting the Data-type data packet from the event ID set that is waiting for the arrival of the next data packet and a RetransReq event ID set that is waiting for single data packet retransmission feedback;

(9) querying the physical port of the downstream router of the primary path in the forwarding item of the multi-path forwarding state table module, if the physical port can be queried, forwarding the Data-type data packet from the physical port; if the physical port is not queried, forwarding the Data-type data packet to a phasor data concentrator;

(10) if the Data ID of the Data-type data packet is equal to the Data ID forwarded by the router at last, assigning the minimum value that is no in the Data ID set of the lost data packet reported by the upstream router, starting from the Data ID of a Data-type data packet that is recently forwarded plus 1, to the Data ID that is waiting for the next arriving data packet, and calculating the maximum delay of waiting for the next data packet: $\tau_{next}=(\delta_{next}-\delta_{recent})\times(piat_{max}+\tau_{upstream})$, where $\delta_{next}$ represents the Data ID that is waiting for the next arriving data packet, $\delta_{recent}$ represents the Data ID of the Data-type data packet that is recently forwarded, $piat_{max}$ represents the maximum interval time between two consecutive measurement data packets sent by the phasor measurement unit, and $\tau_{upstream}$ represents the maximum value of uplink transmission delay between the router and its adjacent upstream router; and

(11) starting a timing scheduled task event by the router, delaying the execution of the timing scheduled task event, and if the event ID set that is waiting for the arrival of the next data packet is removed, terminating the execution of the task; the execution of the task includes two steps: firstly, by means of searching for the next hop port exit at the downstream of the primary path in the forwarding state table, sending a Retrans-Report message that carries the information of the Data ID that is waiting for the next arriving data packet to the next hop exit; and then, sending a retransmission request of the RetransReq data packet along Predundant sub-path and the upstream path of the PP, wherein the retransmission type in the data packet is single, the data ID set requesting for retransmission is the Data ID waiting for the next arriving data packet, and the batch retransmission ID is a null value.

2. The reliable resilient router for the wide-area phasor measurement system of the power grid according to claim 1, wherein the working process of the RetransReq data packet processing module is:

(1) extracting a data ID set requesting for retransmission from the RetransReq data packet, for each Data ID requesting for retransmission, searching for the most matched data packet in the content storage queue module, and if a query value is empty, ending this process; and (2) extracting a retransmission type from the data packet as batch or single, packaging the matched data packet into a new Data-type data packet, assigning a corresponding communication pair, a redundant sub-path corresponding to an entrance port, a retransmission type and the Data ID of the matched data packet to the RSGID, Path ID, data type and Data ID thereof, respectively, setting a Transient tag, and sending the Transient tag back to an entrance physical port of the data packet.

3. The reliable resilient router for the wide-area phasor measurement system of the power grid according to claim 1, wherein the working process of the RetransReport data packet processing module is:

(a) extracting a Data ID set from the RetransReport data packet, recording the Data ID set as the Data ID set of a newly discovered lost data packet, if the Data ID of the newly discovered lost data packet is greater than 0, merging the Data ID of the newly discovered lost data packet into the Data ID set of the RetransReport data packet of the upstream router of the current router, wherein the Data ID that is waiting for the next arriving data packet is −1; and if the Data ID of the newly discovered lost data packet is not greater than 0, skipping to step (d);

(b) for each data packet that exists in the Data ID set of the RetransReport data packet of the upstream router of the current router, if the data packet exists in the event ID set that is waiting for the arrival of the next data packet, removing the data packet from the event ID set that is waiting for the arrival of the next data packet and the RetransReq event ID set that is waiting for the single data packet retransmission feedback, and updating the Data ID that is waiting for the next arriving data packet to the maximum value of the Data ID that is waiting for the next arriving data packet and the Data ID of an arriving data packet; and then removing the Data ID of the arriving data packet from the Data ID set of the data packet that is waiting for batch retransmission;

(c) if the Data ID that is waiting for the next arriving data packet is not equal to −1, assigning the $\delta_{next}$ the minimum value that is not in $\Delta_{losts}$ starting from $\delta_{recent}+1$, and calculating the maximum delay of waiting for the next data packet: $\tau_{next}=(\delta_{next}-\delta_{recent})\times(piat_{max}+\tau_{upstream})$; and then starting a timing scheduled task event by the router, delaying the execution of the task for $\tau_{next}$, and if the timing scheduled task event is removed, terminating the execution of the timing scheduled task event; and (d) querying the physical port of the next hop router on the primary path in the forwarding item of the multi-path forwarding state table module, and forwarding the RetransReport data packet from the physical port.

4. The reliable resilient router for the wide-area phasor measurement system of the power grid according to claim 1, wherein the working process of the basic data packet processing module is:

(1) if the router is a node on the redundant sub-path and a node on a non-primary path, according to a path ID and a forwarding direction of the data packet, querying a corresponding forwarding item in the multi-path forwarding state table module, if the forwarding item is not empty, labeling the data packet with a Transient tag, and sending the data packet out from the physical port corresponding to the queried forwarding item;

(2) if the packet is not labeled with the Transient tag, storing the data packet in the content storage queue;

(3) if the data packet is not a data packet that is forwarded on the primary path in the forwarding item of the multi-path forwarding state table module, according to the path ID and the forwarding direction of the data packet, querying a corresponding forwarding item in a local forwarding table, if the forwarding item is not empty, labeling the data packet with the Transient tag, and sending the data packet out from the physical port corresponding to the queried forwarding item; and (4) if an operator of the data packet is Data, calling the Data-type data packet processing module; if the operator of the data packet is RetransReq, calling the RetransReq data packet processing module; and if the operator of the data packet is RetransReport, calling the RetransReport data packet processing module.

5. The reliable resilient router for the wide-area phasor measurement system of the power grid according to claim 1, wherein the working process of the content storage queue module is:

(1) under initial conditions, initializing a first-in-first-out queue locally, wherein the size of each unit in the first-in-first-out queue is not less than the maximum value of the size of the data packet;

(2) when there is a data packet storage request, pushing the data packet to the end of the first-in-first-out queue, and if the first-in-first-out queue is full, removing a head element of the first-in-first-out queue before the above pushing operation in the step (2); and (3) when there is a Data ID query request of the data packet, searching for the Data ID of the data packet that most matches the Data ID of the data packet in the first-in first-out queue, and returning the matched data packet to a requester; and if no matched data packet is found, returning a null value.

6. The reliable resilient router for the wide-area phasor measurement system of the power grid according to claim 1, wherein the multi-path forwarding state table module is composed of multiple forwarding rule items and a forwarding state set corresponding to the RSGID.

\* \* \* \* \*